(12) United States Patent
Buelow, II et al.

(10) Patent No.: US 7,194,184 B2
(45) Date of Patent: Mar. 20, 2007

(54) LIGHT PIPE WITH SIDE-LIGHT EXTRACTION

(75) Inventors: Roger F. Buelow, II, Gates Mills, OH (US); Chris H. Jenson, Twinsburg, OH (US); John M. Davenport, Middleburg Heights, OH (US)

(73) Assignee: Fiberstars Incorporated, Solon, OH (US)

( * ) Notice: Subject to any disclaimer, the term of this patent is extended or adjusted under 35 U.S.C. 154(b) by 184 days.

(21) Appl. No.: 10/797,761

(22) Filed: Mar. 10, 2004

(65) Prior Publication Data

US 2004/0179777 A1 Sep. 16, 2004

Related U.S. Application Data

(60) Provisional application No. 60/453,398, filed on Mar. 10, 2003, provisional application No. 60/467,224, filed on May 1, 2003.

(51) Int. Cl.
*G02B 6/00* (2006.01)
(52) U.S. Cl. .................. 385/142; 385/123; 385/144; 385/901; 362/582
(58) Field of Classification Search ........ 385/123–128, 385/141–145, 31; 362/582
See application file for complete search history.

(56) References Cited

U.S. PATENT DOCUMENTS

| 4,422,719 A | | 12/1983 | Orcutt | |
| 5,579,429 A | * | 11/1996 | Naum | 385/143 |
| 5,937,127 A | * | 8/1999 | Zarian et al. | 385/128 |
| 5,982,969 A | | 11/1999 | Sugiyama et al. | |

(Continued)

FOREIGN PATENT DOCUMENTS

EP 0 841 141 A2 * 5/1998

(Continued)

OTHER PUBLICATIONS 1 page entitled "Technical Notes" from http://www.zeusinc.com/zeus-catalog-11.pdf webpage (when last viewed on May 2, 2004) showing products produced by extrusion technology—admitted as prior art.
Specification and drawings for U.S. Appl. No. 10/796,830, filed Mar. 9, 2004, for Light Pipe with Directional Side-Light Extraction by Roger F. Buelow II, John M. Davenport, and Chris Jenson.

(Continued)

*Primary Examiner*—Sung Pak
*Assistant Examiner*—James D. Stein
(74) *Attorney, Agent, or Firm*—Charles E. Bruzga; Bruzga & Associates (57) ABSTRACT

A light pipe with uniform side-light emission has a core comprising a polymer, and a fluoropolymer cladding on the core with a lower refractive index than the core. Light-scattering material is distributed within the core along an active section of light pipe in which side-light emission is desired, with a density gradient chosen to achieve uniform side-light emission. Another light pipe with uniform side-light emission has a core comprising a polymer, and a fluoropolymer cladding on the core with a lower refractive index than the core. Light-scattering material is distributed within at least one of the cladding and the core along an active section of light pipe in which side-light emission is desired, with a density gradient chosen to yield uniform side light emission, and substantially only in a radial swath, along the longitudinal axis of the light pipe, of substantially less than 360 degrees.

21 Claims, 8 Drawing Sheets

U.S. PATENT DOCUMENTS

| | | | |
|---|---|---|---|
| 6,154,595 A * | 11/2000 | Yokogawa et al. | 385/127 |
| 6,278,827 B1 | 8/2001 | Sugiyama et al. | |
| 6,563,993 B1 * | 5/2003 | Imamura et al. | 385/123 |
| 6,621,973 B1 | 9/2003 | Hoffman | |
| 6,714,711 B1 * | 3/2004 | Lieberman et al. | 385/124 |

FOREIGN PATENT DOCUMENTS

| | | | |
|---|---|---|---|
| JP | 06-118238 | | 4/1994 |
| JP | 6-69903 | | 9/1994 |
| WO | WO 98/08024 | * | 8/1997 |
| WO | WO 02/052314 A1 | * | 7/2002 |

OTHER PUBLICATIONS

This application is copending with the present application and is assigned, or subject to assignment, to the same assignee as the present application.

Specification and drawings for U.S. Appl. No. 10/797,383, filed Mar. 10, 2004, for Light Pipe with Side Light Extraction by Roger F. Buelow II, Chris H. Jenson, and John M. Davenport.

Specification and drawings for U.S. Appl. No. 10/108,279, filed Apr. 18, 2005, for Efficient Luminaire with Directional Side-Light Extraction by William J. Cassarly, Thomas L.R. Davenport, John M. Davenport, and Chris H. Jenson.

* cited by examiner

LIGHT PIPE WITH SIDE-LIGHT EXTRACTION

This application claims priority from U.S. Provisional Application No. 60/453,398 filed Mar. 10, 2003 and from U.S. Provisional Application No. 60/467,224 filed May 1, 2003.

FIELD OF THE INVENTION

The present invention relates to light pipes constructed with light-scattering material for extracting light from side of the light pipe. One aspect of the invention relates to construction of light pipes with the light-scattering material substantially confined to a radial swath, along the longitudinal axis of the light pipes, of substantially less than 360 degrees.

BACKGROUND OF THE INVENTION

Light pipe is used in two main ways. In an end-light application, the light pipe is optimized to carry light along its length, and transmit it at the output face of the light pipe. In a side-light application, light is extracted out the side of the light pipe and provides illumination along its length. Often, light extracted from the side of a light pipe over the full 360 degrees around the light pipe is undesirable because a reflector would be needed to redirect a significant portion of the light towards the intended area to be illuminated. Some of the redirected light impinges on the light pipe and may be either absorbed into the light pipe so as to reduce side-light output, or is scattered into unintended directions. This is the same drawback associated with fluorescent lighting and results in an inefficient fixture for delivering light onto the target surface.

One aspect of the present invention relates to distributing light-scattering material only in a radial swath, along the longitudinal axis of the light pipe, of substantially less than 360 degrees. This results in extraction of side light in a directional manner, rather than over the full 360 degrees around the light pipe. The light-scattering material could be of the reflective type, of the refractive type, or of both types.

In accordance with one embodiment of the invention, it would be desirable to distribute light-scattering material in the core of a light pipe with a density gradient for achieving uniformity in side-light emission along the length of the light pipe. As used herein, "uniformity" in side-light emission means that the lumen output as between inlet and outlet portions of a side-light emitting section of the light pipe is within plus or minus 20 percent of the average value of each other. More uniformity than this may also be desirable in some circumstances.

In accordance with another embodiment of the invention, it would be desirable to eliminate the inefficient fixture and reflector combination for use with a light pipe by extracting the light only in the desired direction, towards a target area to be illuminated.

SUMMARY OF THE INVENTION

A first embodiment of the invention provides a light pipe with uniform side-light emission. The light pipe has a core comprising a polymer, and a fluoropolymer cladding on the core with a lower refractive index than the core. Light-scattering material is distributed within the core along an active section of light pipe in which side-light emission is desired, with a density gradient chosen to achieve uniform side-light emission.

A second embodiment of the invention also provides a light pipe with uniform side-light emission. The light pipe has a core comprising a polymer, and a fluoropolymer cladding on the core with a lower refractive index than the core. Light-scattering material is distributed within at least one of the cladding and the core along an active section of light pipe in which side-light emission is desired. The light-scattering material is distributed within at least one of the core or the cladding along the active section of the light pipe with a density gradient chosen to yield uniform side light emission, and substantially only in a radial swath, along the longitudinal axis of the light pipe, of substantially less than 360 degrees, so that light preferentially exits the light pipe from the radial swath.

The foregoing, second embodiment eliminates the inefficient fixture and reflector combination for use with a light pipe by extracting the light only in the desired direction, towards a target area to be illuminated.

BRIEF DESCRIPTION OF THE DRAWINGS

In the drawing figures, like reference numerals refer to like parts, and so written description of a part may appear in an earlier figure, for instance.

DETAILED DESCRIPTION OF THE INVENTION

This description discusses the three topics of (1) context of the invention, (2) principles of the light pipes of the invention, and (3) manufacturing concerns.

1. Context of the Invention

Figure 1:
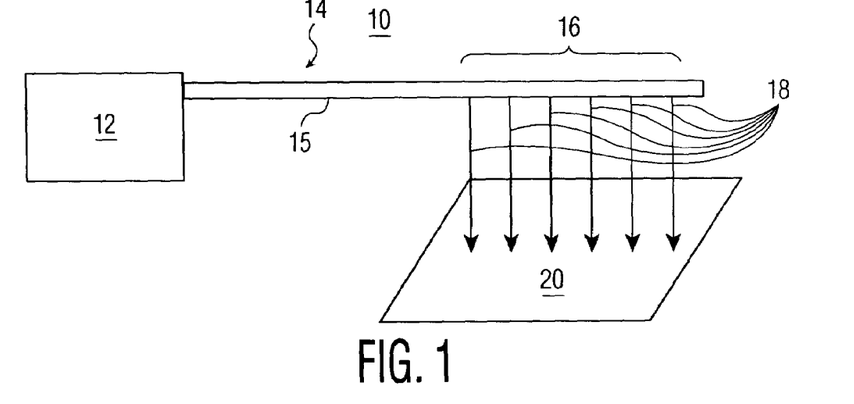
FIG. 1 is a simplified side view of a sidelight illumination system showing basic elements for delivering sidelight for illumination purposes.

FIG. 1 shows a sidelight illumination system 10 in which a light source 12 delivers light to a light pipe 14, which has a section 15 that does not emit side light and an active section 16 for emitting side light. In one embodiment of the invention, the side light is directed around the full 360 degree swath around the longitudinal axis of the light pipe, with light-scattering material being distributed in the core of the light pipe with a density gradient for achieving uniform emission of side light In another embodiment of the invention, the side light emitted shines in the direction of arrows 18 toward a target area 20 to be illuminated.

An efficient means of extracting light from a light pipe for sidelight illumination is through the addition light-scattering material to the light pipe. The light-scattering material may comprise refractive-type material or reflective-type material or both. A preferred light-scattering material is titanium dioxide (TiO$_2$) particles, but other light-scattering material as will be apparent to those of ordinary skill in the art can be used. The light-scattering material can be added to the light pipe in either the core of the light pipe, the cladding surrounding the core, or both. Through the use of an extrusion process, the light-scattering material could be added to the cladding, the core, or both in either a uniformly distributed manner or in a gradient manner where the concentration of light-scattering material becomes more dense along the length of the light pipe to vary the light-extraction efficiency of the light pipe.

Figure 2A:
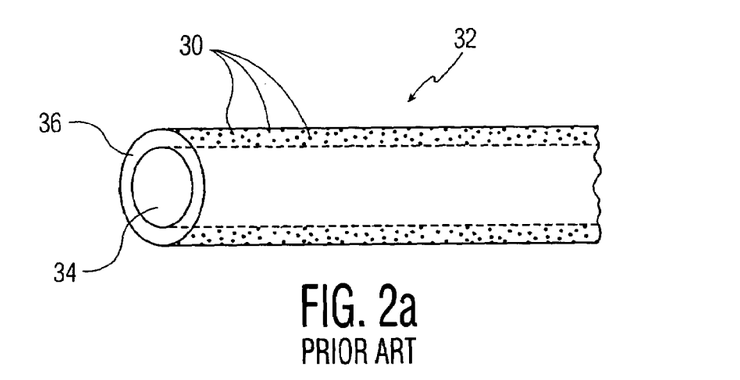
FIG. 2a is a side view in perspective of a prior art light pipe in which the distribution of light-scattering material in a cladding is uniform.

In accordance with the prior art, FIG. 2a shows light-scattering material 30 distributed along a section of light pipe 32, which has a polymer core 34 and a fluoropolymer cladding 36 on the core with a lower refractive index than the core. Material 30, which may comprise light-scattering material, is distributed in a uniform manner. This would achieve uniform side-light emission for relatively shorter lengths of light pipe.

Figure 2B:
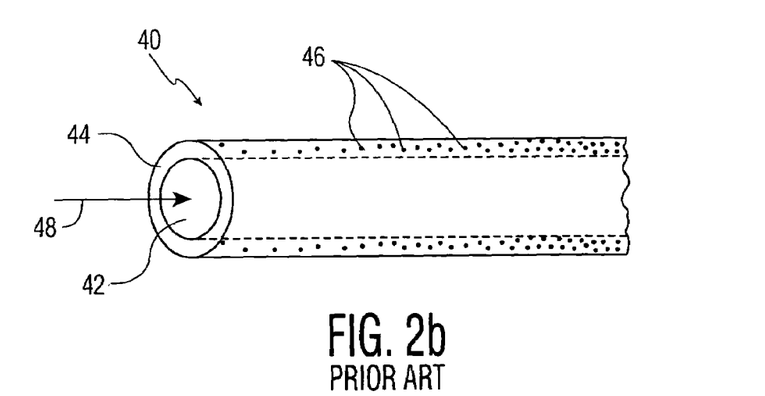
FIG. 2b is a side view in perspective of a prior art light pipe in which the density of light-scattering material distributed within a cladding has a gradient for achieving uniform illumination.

Further, in accordance with the prior art, FIG. 2b shows a light pipe 40 with a polymer core 42 and a fluoropolymer cladding 44 on the core having a lower refractive index than the core. Light-scattering material 46, which may comprise light-scattering material, has a density along the light pipe in the direction of supply light 48 that has a gradient for achieving uniformity of side light emission. In particular, the further away from supply light 48, the higher the density of light-scattering material. This is required for relatively long lengths of light pipe, because, with less light available at increasing distances from supply light 48, more light-scattering material is needed to attain the same amount of side-light emission.

Figure 3A:
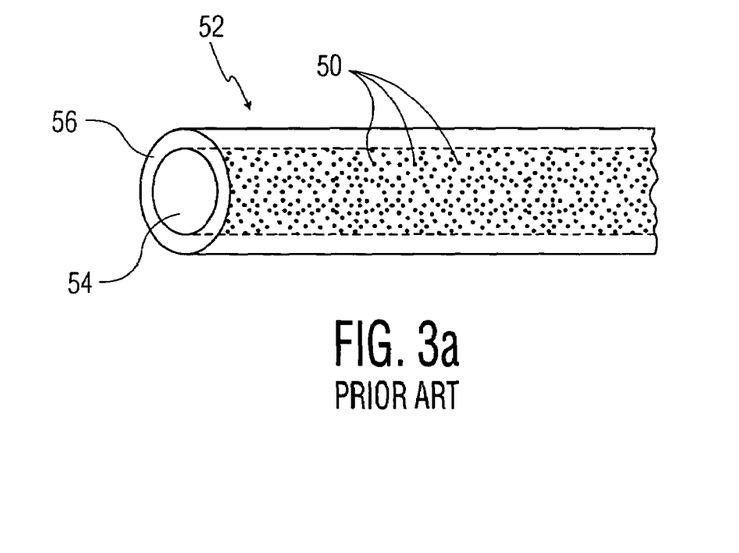
FIG. 3a is a side view in perspective of a prior art light pipe showing light-scattering material distributed within the core of the light pipe core in a uniform manner.

Also in accordance with the prior art, FIG. 3a shows light-scattering material 50 distributed along a section of light pipe 52, which has a polymer core 54 and a fluoropolymer cladding 56 on the core with a lower refractive index than the core. Material 50, which may comprise particles that reflect light, refract light, or both, for instance, is distributed in a uniform manner. This would achieve uniform side-light emission especially for relatively shorter lengths of light pipe.

2. Principles of Light Pipes of the Invention

Figure 3B:
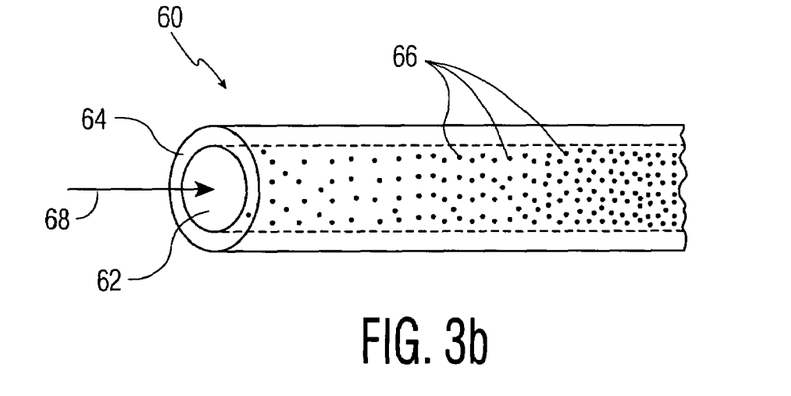
FIG. 3b is a side view in perspective of a light pipe in which the density of light-scattering material distributed within a core of a light pipe has gradient for achieving uniform illumination.

FIG. 3b shows a light pipe 60 with a polymer core 62 and a fluoropolymer cladding 64 on the core having a lower refractive index than the core. Light-scattering material 66, which may comprise reflective- or refractive-type light-scattering particles, for instance, has a density along the light pipe in the direction 68 of supply light that has a gradient for achieving uniformity of side light emission. In particular, the further away form supply light 68, the higher the density of light-scattering material.

In accordance with a preferred embodiment of the invention, light-scattering material (not shown) may also be added to the light pipe in a manner that would favor light extraction from one side of the light pipe over the other.

Figure 4A:
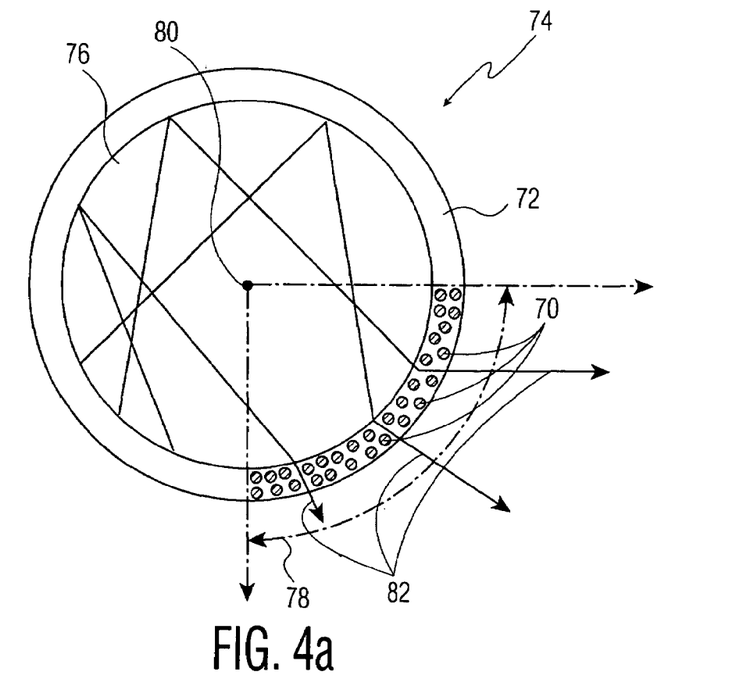
FIG. 4a shows a simplified cross sectional view of a light pipe in which light-scattering material is placed in a radial swath of the light pipe cladding, along a longitudinal axis of the light pipe, of substantially less than 360 degrees.

Thus, FIG. 4a shows the distribution of light-scattering material 70 in a fluoropolymer cladding 72 of a light pipe 74. Light pipe 74 has a polymer core 76 with a higher refractive index than the cladding. Light-scattering material 70 is distributed in a radial swath 78 of the light pipe, along a longitudinal axis 80 of the light pipe, of substantially less than 360 degrees. Preferably, radial swath ranges from less than 10 degrees to about 180 degrees to achieve a favored, or more pronounced, side light emission, as shown by light rays 82, toward a typical target area 20 as shown in FIG. 1. More preferably, such radial swath is between about 45 and 90 degrees.

Figure 4B:
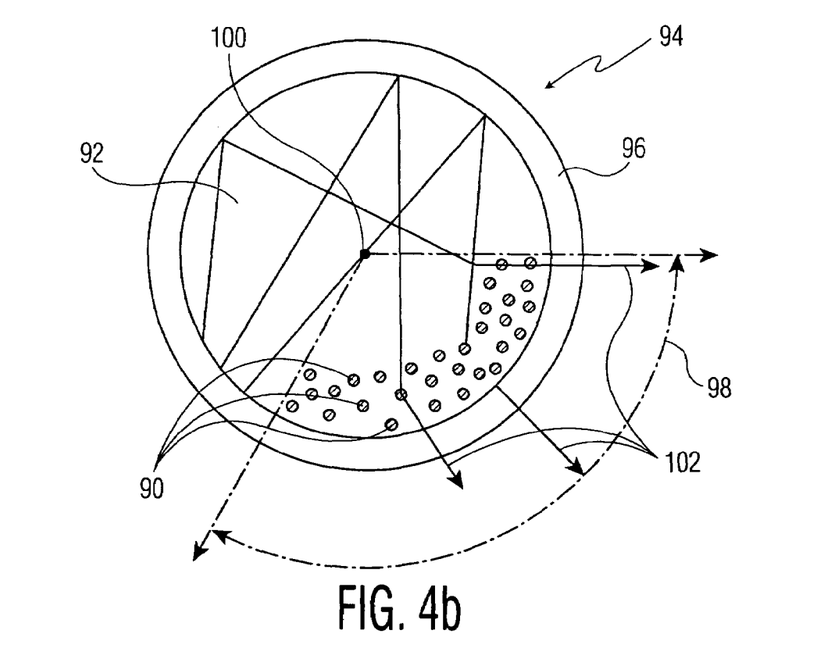
FIG. 4b shows a simplified cross sectional view of a light pipe in which light-scattering material is placed in a radial swath of the light pipe core, along a longitudinal axis of the light pipe, of substantially less than 360 degrees.

Similarly, FIG. 4b shows the distribution of light-scattering material 90 in a polymer core 92 of a light pipe 94 having, on the core, a fluoropolymer cladding 96 with a lower refractive index than the core. Light-scattering material 90 is distributed in a radial swath 98 of the light pipe, along a longitudinal axis 100 of the light pipe, of substantially less than 360 degrees. Preferably, radial swath ranges from less than 10 degrees to about 180 degrees to achieve a favored, or more pronounced, side light emission, as shown by light rays 102, toward a typical target area 20 as shown in FIG. 1. More preferably, such radial swath is between about 45 and 90 degrees.

Light-scattering material can be placed in a light pipe both in a light-pipe cladding, as in FIG. 4a, and in a light-pipe core, as in FIG. 4b.

Figure 5A:
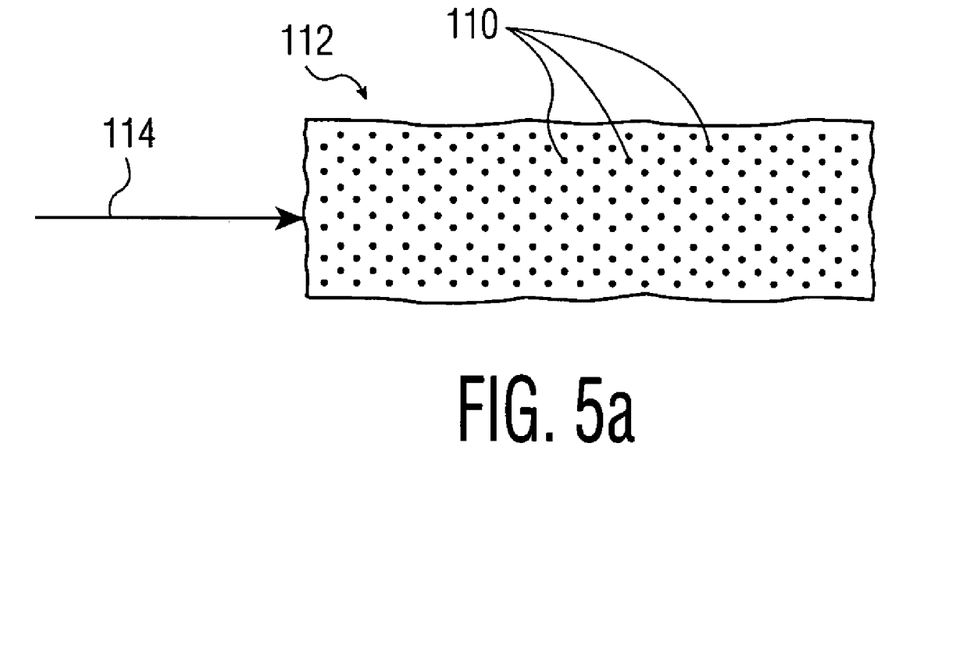
FIG. 5a shows a fragment of light pipe with a uniform distribution of light-scattering material.
Figure 5B:
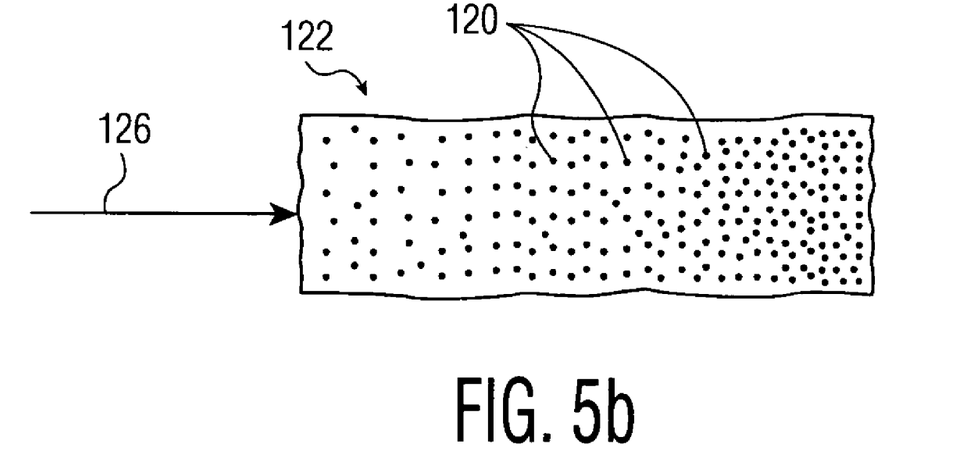
FIG. 5b shows a fragment of light pipe with the density of light-scattering material distributed with a gradient to achieve uniform side-light emission.

Regarding the embodiments of FIGS. 4a and 4b, the density of light-scattering material in the core or clad can be uniform along the longitudinal axis of the light pipe. Thus, FIG. 5a shows a fragment 112 of either a core or clad in which light-scattering material 110 is distributed in a uniform manner along the direction of supply light 114. Alternatively, FIG. 5b shows a fragment 122 of either a core or clad in which light-scattering material 120 has a gradient in its density of distribution. In particular, the further away from light source 126, the higher the density of light-scattering material 120.

3. Manufacturing Concerns

Figure 6A:
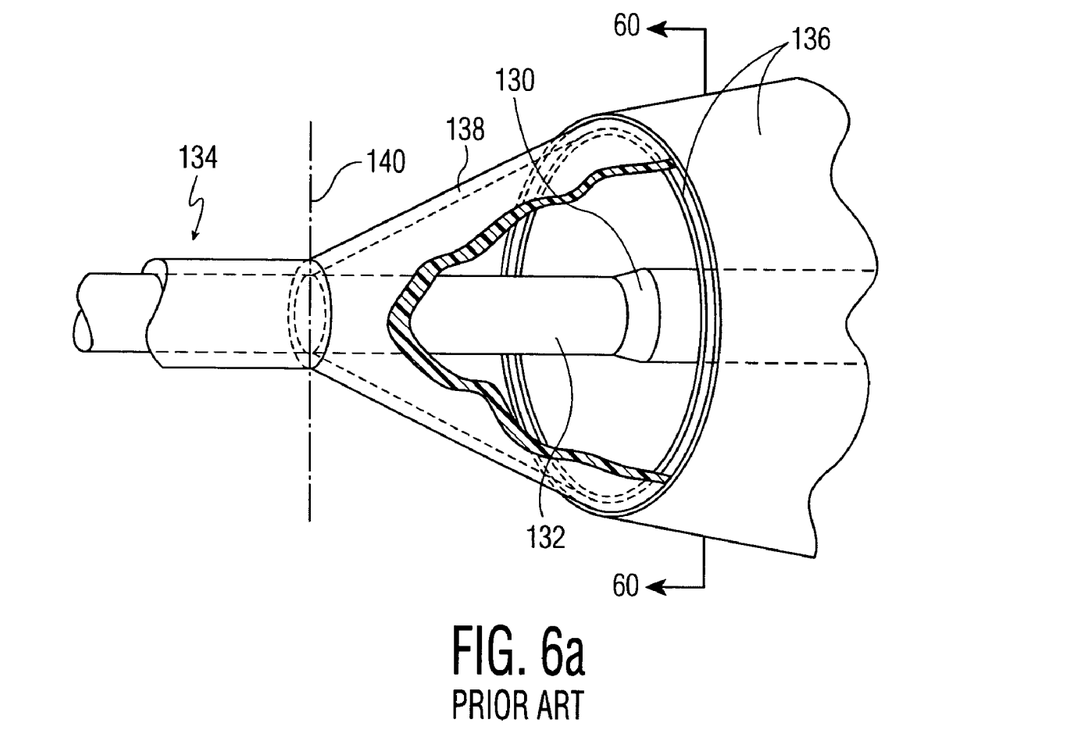
FIG. 6a is a simplified, perspective view of various portions of a prior art co-extrusion die in operation, with a molten flow of cladding material partially cutaway.

In making the light pipes of FIGS. 4a and 4b in which light-scattering material is confined to a radial swath of the cladding and the core, respectively, the prior art co-extrusion process shown in FIG. 6a for making light pipe can be suitably modified.

FIG. 6a shows two nozzles for forming two portions of a light pipe. Specifically, it shows a nozzle 130 for forming a core 132 of a light pipe 134, and another nozzle 136 for forming a cladding 138, shown in a molten state before reaching and surrounding the core at location 140. With this background on a basic co-extrusion process, the following details of making the embodiments of FIGS. 4a and 4b can be better understood.

Figure 6B:
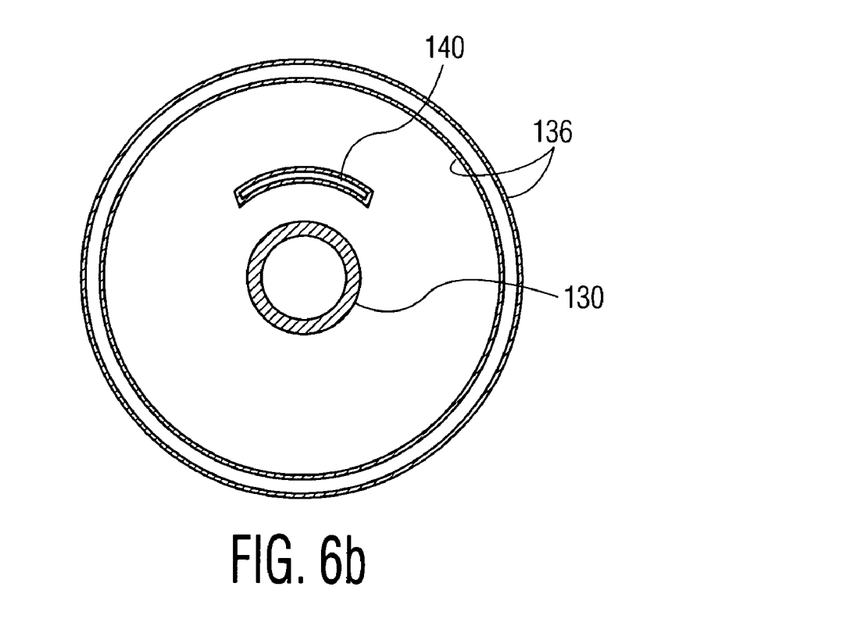
FIG. 6b is a simplified, cross-sectional slice of various portions of a co-extrusion die taken at Arrows 60—60 in FIG. 6a and omitting the fluid materials for forming portions of a light pipe.
Figure 6C:
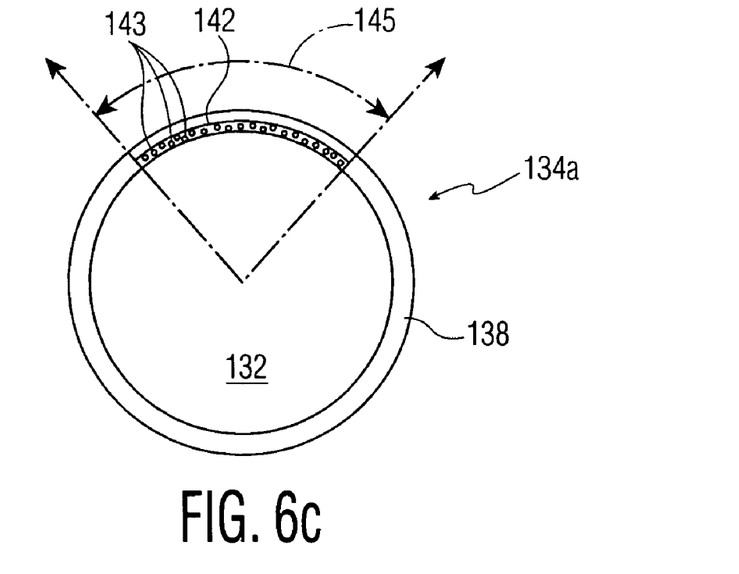
FIG. 6c is a cross-sectional view of a light pipe formed according to the die apparatus of FIG. 6b.

FIG. 6b shows nozzles 130 and 136 for making the core and cladding, respectively, from the perspective of Arrows 60—60 in FIG. 6a. To add light-scattering material to the cladding, as in FIG. 4a, an auxiliary nozzle 140 can be added near core nozzle 130. Auxiliary nozzle 140 may typically contain molten fluoropolymer to form the cladding, with the addition of light-scattering material. The nozzles of FIG. 6b will create a light pipe 134a, as shown in FIG. 6c, in which a region 142 with light-scattering material 143 at the core-clad interface exists within the confines of a radial swath 145 of the light pipe. Such radial swath is substantially less than 360 degrees about a longitudinal axis of the light pipe, in accordance with an embodiment of the invention.

Figure 6D:
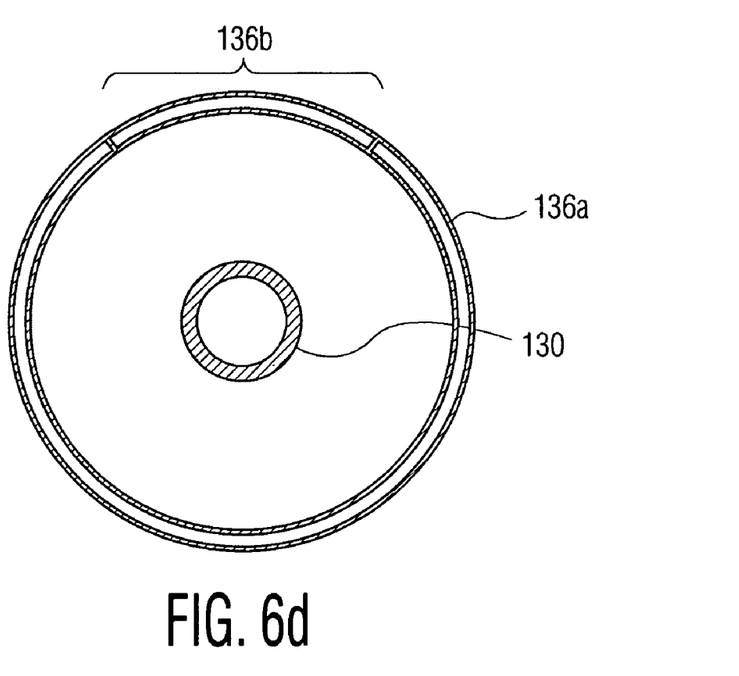
FIG. 6d is similar to FIG. 6b, but shows a different arrangement of various portions of a co-extrusion die.
Figure 6E:
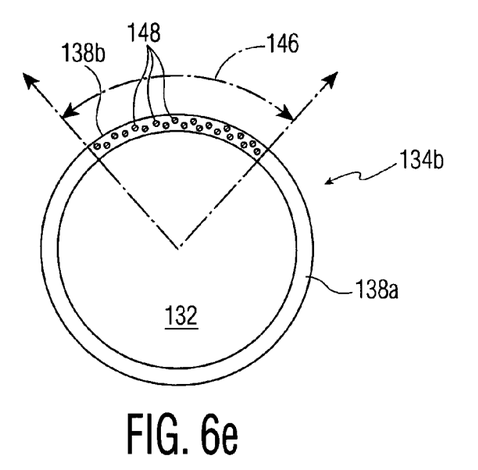
FIG. 6e is a simplified, cross-sectional view of a light pipe formed according to the die apparatus of FIG. 6d.

FIG. 6d shows another arrangement of nozzles for modifying the die of FIG. 6a, to make the light pipe of FIG. 4a. In FIG. 6d, core nozzle 130 remains the same as in FIG. 6a, but nozzle 136 (FIG. 6a) has been modified to form two separate portions 136a and 136b. Portion 136a forms a radial swath of the cladding without light-scattering material, whereas portion 136b forms a radial swath of the cladding with light-scattering material. FIG. 6e shows light pipe 134b made by the nozzle arrangement of FIG. 6d, in which a cladding portion 138b includes light-scattering material 148 within a radial swath 146 of the light pipe. Such radial swath is substantially less than 360 degrees about a longitudinal axis of the light pipe, in accordance with an embodiment of the invention. Cladding portion 138a is free of light-scattering material.

Figure 6F:
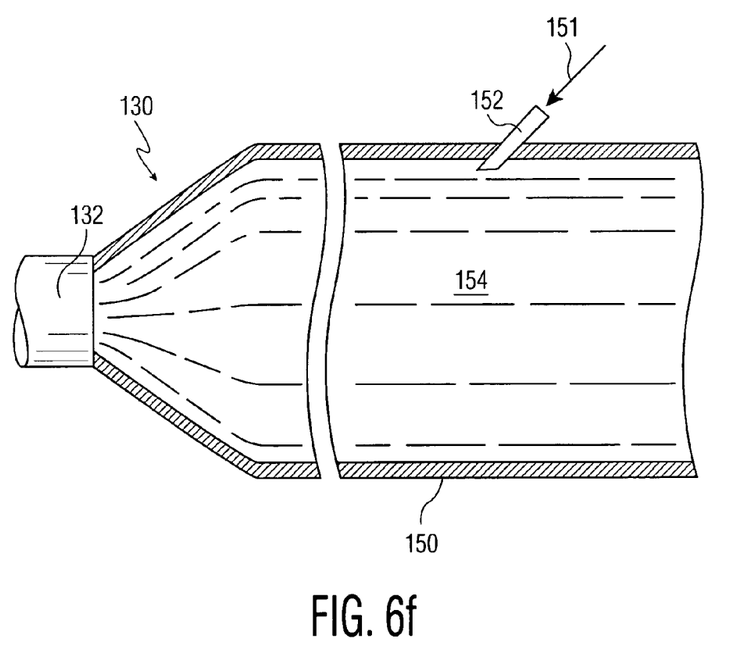
FIG. 6f is a side plan view of a nozzle for the core of FIG. 4a, partially in cross section.

For making the embodiment of FIG. 4b of the invention, with light-scattering material confined to a radial swath of the core of a light pipe, the basic co-extrusion apparatus of FIG. 6a can be modified as shown in FIG. 6f.

FIG. 6f shows nozzle 130 of FIG. 6a, with a feed pipe 150 for supplying the nozzle with material for forming a light pipe core. An injection tube 152 is inserted a short distance into feed pipe 150, so as to inject a substance 151 into a main flow 154 of molten material for forming core 132. Substance 151 comprises light-scattering material, and typically also molten material for forming core 132. Main flow 154 comprises a laminar flow of molten material, at least in the vicinity of injection tube 152. The injection of substance 151 into main flow 154 is controlled so as not to create undue turbulence in the laminar flow of molten core material that would prevent the desired distribution of light-scattering material in the core.

Figure 6G:
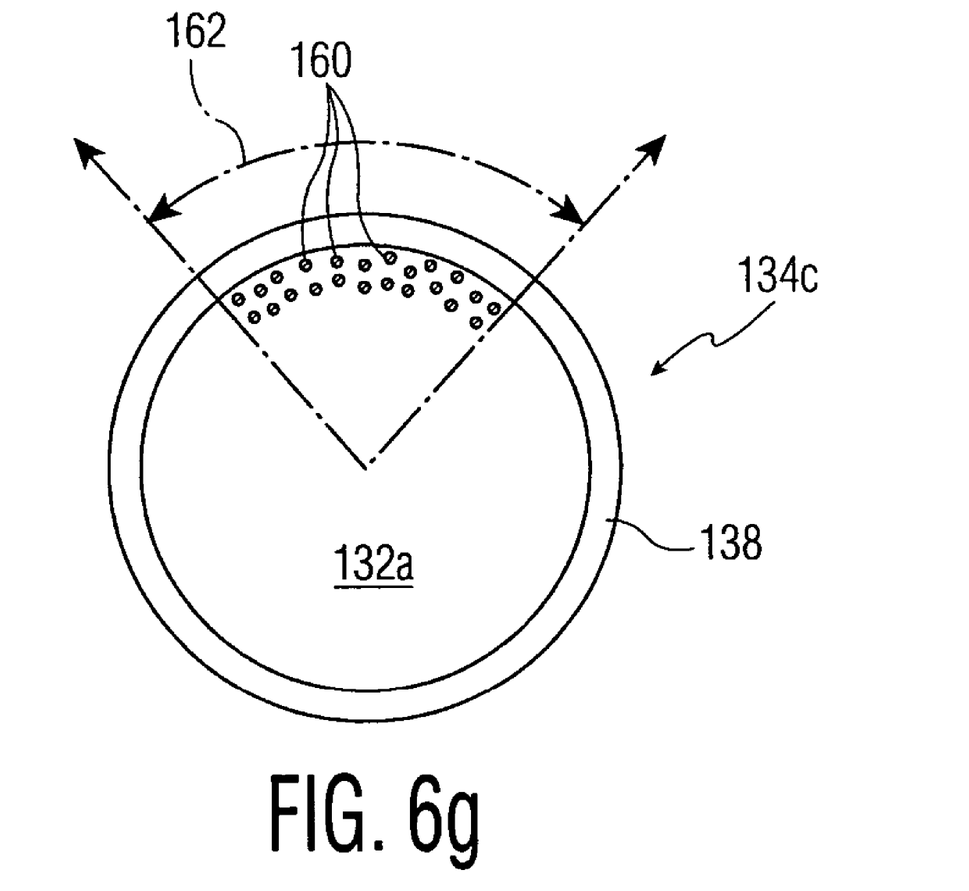
FIG. 6g is a simplified, cross-sectional view of a light pipe formed according to the die apparatus of FIG. 6f.

FIG. 6g shows a light pipe 134c made from the modified apparatus of FIG. 6f as used with the basic co-extrusion apparatus of FIG. 6a. Light-scattering material 160 in core 132a is confined to a radial swath 162 of the light pipe substantially less than 360 degrees, in accordance with FIG. 4b. If radial swath 162 is of considerable extent, more than one injection tube 151 can be used in the apparatus of FIG. 6f.

Finally, to obtain a differential density, or a density gradient, for light-scattering material, light-scattering material may be metered into the various flows of molten material as discussed in connection with FIGS. 6a–6g, for instance.

Such metering would occur over time, with the density of light-scattering material changing (i.e., increasing or decreasing) over time.

The co-extrusion technology discussed in connection with FIGS. 6a–6g, and the foregoing technology for metering of light-scattering material, will be apparent to those of ordinary skill in the art from the present specification.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A light pipe with uniform side-light emission, comprising:
    a) a core comprising a polymer and a fluoropolymer cladding on the core; the cladding having a lower refractive index than the core; and
    b) light-scattering material distributed within the core along an active section of light pipe in which side-light emission is desired;
    c) the light-scattering material being distributed with a non-zero density gradient along a longitudinal axis of the light pipe chosen to achieve uniform side-light emission; and
    d) the core lacking any significant variation in refractive index along the longitudinal axis as measured without regard to the presence of the light-scattering material.

2. The light pipe of claim 1, wherein the light-scattering material comprises titanium dioxide.

3. A light pipe with uniform side-light emission, comprising:
    a) a core comprising a polymer and a fluoropolymer cladding on the core; the cladding having a lower refractive index than the core; and
    b) light-scattering material distributed within the core along an active section of light pipe in which side-light emission is desired;
    c) the light-scattering material being distributed in the core along the active section of the light pipe, substantially only in a radial swath, along the longitudinal axis of the light pipe, of substantially less than 360 degrees, so that light exits the light pipe in a directional manner.

4. The light pipe of claim 3, wherein the radial swath less than about 180 degrees.

5. The light pipe of claim 4, wherein the radial swath is more than about 10 degrees.

6. The light pipe of claim 4, wherein the radial swath is less than about 90 degrees.

7. The light pipe of claim 3, wherein the lumen output as between inlet and outlet portions of a the active section is within plus or minus 10 percent of the average value of each other.

8. The light pipe of claim 3, wherein the light-scattering material is uniformly distributed along a longitudinal axis of the active section of the light pipe substantially only in a radial swath, along the longitudinal axis of the light pipe, of substantially less than 360 degrees, so that light exits the light in a directional manner.

9. The light pipe of claim 8, wherein the radial swath is less than about 180 degrees.

10. The light pipe of claim 9, wherein the radial swath is more than about 10 degrees.

11. The light pipe of claim 9, wherein the radial swath is less than about 90 degrees.

12. The light pipe of claim 8, wherein the lumen output as between inlet and outlet portions of the active section is within plus or minus 10 percent of the average value of each other.

13. A light pipe with uniform side-light emission, comprising:
   a) a core comprising an acrylic polymer and a fluoropolymer cladding on the core; the cladding having a lower refractive index than the core; and
   b) light-scattering material being distributed in the core along an active section of the light pipe in which side-light emission is desired;
   c) the light-scattering material being distributed substantially only in a radial swath, along the longitudinal axis of the light pipe, of less than about 180 degrees, so that light exits the light pipe in a directional manner.

14. The light pipe of claim 13, wherein the light-scattering material comprises titanium dioxide particles.

15. The light pipe of claim 14, wherein the radial swath is between about 30 and 45 degrees.

16. The light pipe of claim 15, wherein the active section is between about 0.5 end 5 meters long.

17. The light pipe of claim 16, wherein the active section is between about 1.5 and 2.5 meters long.

18. The light pipe of claim 16, wherein the particles are distributed with a non-zero density gradient along a longitudinal axis of the light pipe chosen to result in uniform illumination along the active section.

19. The light pipe of claim 18, wherein the lumen output as between inlet and outlet portions of the active section is within plus or minus 10 percent of the average value of each other.

20. A light pipe with uniform side-light emission, comprising:
   a) a core comprising a polymer and a fluoropolymer cladding on the core; the cladding having a lower refractive index than the core; and
   b) light-scattering material distributed within the core along an active section of light pipe in which side-light emission is desired;
   c) the light-scattering material being distributed with a non-zero density gradient along a longitudinal axis of the light pipe chosen to achieve uniform side-light emission; and
   d) the light-scattering material being distributed in the core along the active section of the light pipe, substantially only in a radial swath, along the longitudinal axis of the light pipe, of substantially less than 360 degrees, so that light exits the light pipe in a directional manner.

21. The light pipe of claim 20, wherein the light-scattering material comprises titanium dioxide.

* * * * *

UNITED STATES PATENT AND TRADEMARK OFFICE
CERTIFICATE OF CORRECTION

PATENT NO. : 7,194,184 B2
APPLICATION NO. : 10/797761
DATED : March 20, 2007
INVENTOR(S) : Buelow, II et al.

It is certified that error appears in the above-identified patent and that said Letters Patent is hereby corrected as shown below:

Column 1, after line 7 insert:

GOVERNMENT INTEREST

This invention was made with Government support under Agreement Number DAAH01-03-9-R001 awarded by the U.S. Army Aviation and Missile Command. The Government has certain rights in the invention.

Signed and Sealed this

Nineteenth Day of August, 2008

JON W. DUDAS
*Director of the United States Patent and Trademark Office*